(12) United States Patent
Nakayama

(10) Patent No.: US 6,188,664 B1
(45) Date of Patent: Feb. 13, 2001

(54) PIVOTABLE RESTRAINING MEANS FOR A DISK OPERATING APPARATUS

(75) Inventor: Keisuke Nakayama, Miyagi-ken (JP)

(73) Assignee: Alps Electric Co., Ltd., Tokyo (JP)

( * ) Notice: Under 35 U.S.C. 154(b), the term of this patent shall be extended for 0 days.

(21) Appl. No.: 09/164,046

(22) Filed: Sep. 30, 1998

(30) Foreign Application Priority Data

Oct. 3, 1997 (JP) .................................................. 9-270884

(51) Int. Cl.$^7$ .................................................. G11B 17/04
(52) U.S. Cl. .......................................................... 369/178
(58) Field of Search .................................. 369/178, 75.2

(56) References Cited

U.S. PATENT DOCUMENTS

| | | | |
|---|---|---|---|
| 4,539,663 | * | 9/1985 | Ishibashi et al. ........................ 369/34 |
| 4,734,898 | * | 3/1988 | Morinaga .................... 369/39 |
| 4,811,324 | * | 3/1989 | Ikedo et al. .......................... 369/75.2 |
| 5,528,442 | * | 6/1996 | Hisatomi ................. 369/191 |
| 5,576,911 | * | 11/1996 | Porter .................. 360/98.06 |

FOREIGN PATENT DOCUMENTS

| | | |
|---|---|---|
| 0 724 261 A3 | 12/1996 | (EP) . |
| 98307902 | 1/1999 | (EP) . |
| 2 241 104 | 8/1991 | (GB) . |
| 60-010452 | 1/1985 | (JP) . |
| 60-138770 | 7/1985 | (JP) . |
| 0217565 * | 9/1988 | (JP) . |
| 406195849 * | 7/1994 | (JP) . |
| 8-190760 | 7/1996 | (JP) . |
| 11-110883 * | 4/1999 | (JP) . |

* cited by examiner

Primary Examiner—George J. Letscher
Assistant Examiner—Julie Anne Watko
(74) Attorney, Agent, or Firm—Brinks Hofer Gilson & Lione

(57) ABSTRACT

A stopper is disposed so as to be opposite to trays, the drawing lever is disposed so as to be opposite to a tray, the lifting base is disposed opposite to a tray when a package is loaded to the disk operating apparatus to restrain the trays from projecting from the package. The bottom tray can be drawn out by the drawing lever immediately after the loading of the package to the disk operating apparatus. A stopper can be turned by an operation to move a lifting base so that the tray can immediately be drawn out.

10 Claims, 5 Drawing Sheets

PIVOTABLE RESTRAINING MEANS FOR A DISK OPERATING APPARATUS

BACKGROUND OF THE INVENTION

1. Field of the Invention

The present invention relates to a disk operating apparatus capable of taking out a selected disk from a disk package containing a plurality of disks for writing information to or reading information from the selected disk and, more specifically, to a disk operating apparatus capable of preventing disks contained in a disk package from projecting from the disk package when the disk package is loaded therein and capable of reducing time between the loading of the disk package and the start of an operation for writing information to or reading information from the disk.

2. Description of the Related Art

Some known disk operating apparatus loaded with a disk package containing a plurality of disks and capable of selecting one of the disks contained in the disk package to write information to or read information from the selected disk is provided with a plurality of trays for supporting disks, contained in the disk package.

When the disk package is inserted into the loading region of the disk operating apparatus, the drawing means draws out a selected disk from the disk package, the selected disk is loaded into the disk drive, and the disk is driven for rotation for a writing or a reading operation.

In an automobile disk operating apparatus, the disk package is loaded into the disk package drive apparatus with an opening through which a tray is drawn out directed in a lateral direction and a side wall not provided with the opening directed forward. In some automobile disk operating apparatus or some disk operating apparatus employed in a computer to operate disks, the disk package is inserted into the loading region of the disk operating apparatus with the opening thereof directed forward.

When a disk package is inserted with great force into the disk operating apparatus in which the disk package is inserted into the loading region with the opening directed forward, the trays contained in the disk package are liable to project accidentally from the disk package into the disk operating apparatus by shocks or inertia and the trays accidentally projected from the disk package are liable to obstruct a tray selecting operation. If the disk package is inserted into the disk operating apparatus with some trays partly projecting from the opening of the disk package, the trays projecting through the opening may possibly obstruct the tray selecting operation.

SUMMARY OF THE INVENTION

The present invention has been made to solve such problems in the conventional disk operating apparatus and it is therefore an object of the present invention to provide a disk operating apparatus capable of preventing trays from accidentally projecting from a disk package.

Another object of the present invention is to provide a disk operating apparatus capable of preventing trays from projecting from a disk package when the disk package is inserted therein and of immediately taking out the tray and the disk from the disk package without being obstructed by a mechanism for preventing the trays from projecting from the disk package.

The present invention provides a disk operating apparatus comprising: a disk package capable of storing, in layers, a plurality of trays carrying disks, and provided with an opening through which the trays are put into and taken out; a loading region into which the disk package is inserted with the opening thereof directed in a direction in which the disk package is inserted into the loading region; disk driving means for driving the disk for a writing and/or a reading operation; a movable base capable of moving in a direction along which the disks are arranged to select the disk; and a drawing means mounted on the movable base to draw out a selected tray from the disk package so that the disk can be loaded into the disk driving means; characterized by a restraining member disposed so as to be opposite to the opening of the disk package and so as to face the trays contained in the disk package to restrain the trays from projecting from the disk package when the disk package is inserted into the loading region, and restraint removing means for shifting the restraining member into a releasing region where the restraining member allows the trays to be put in and taken out of the disk package.

Since the restraining member is positioned in front of the trays contained in the disk package when the disk package is inserted into the disk operating apparatus with the opening thereof directed forward, the trays are restrained from projecting from the disk package when the disk package is inserted into the disk operating apparatus. Even if the disk package is loaded into the disk operating apparatus with the trays contained therein projected therefrom, the trays are returned into the disk package by the restraining member when the disk package is loaded completely into the disk operating apparatus.

A disk drawn out from the disk package by the drawing means may be driven by the disk driving means on the movable base by mounting both the disk driving means and the drawing means on the movable base, or a disk drawn out from the disk package by the drawing means may be driven by the disk driving means by mounting only the drawing means on the movable base, drawing out a tray from the disk package, mounting a disk on the movable base, moving the movable base to a position where the disk driving means is positioned.

In this disk operating apparatus, there is a tray to which the restraining member does not correspond when the disk package is inserted into the loading region, a part of the drawing means stopped at a predetermined position may correspond to the tray to which the restraining member does not correspond to restrain the tray from projecting from the disk package.

A part of the movable base stopping at a predetermined position together with the drawing means may correspond to the tray adjacent to the tray to which the part of the drawing means corresponds to restrain the same tray from projecting from the disk package.

It is preferable that the tray restrained from projecting from the disk package by the drawing means can be drawn out of the disk package while the rest of the trays are restrained from projecting from the disk package by the restraining means.

In this disk operating apparatus, the restraining member is disposed opposite to the front side of the disk package loaded into the disk operating apparatus and restrains one or some of the plurality of trays from projecting from the disk package, and the movable base and the drawing means are opposite to the rest of the trays. In this state, the drawing means is able to draw out the tray from the disk package. Since the tray can immediately be drawn out from the disk package by operating the drawing means in a state where the rest of the trays are restrained by the restraining member, the tray can be drawn out before the restraining member is operated to reduce time between the insertion of the disk package into the disk operating apparatus and the start of driving the disk.

The restraint removing means may be included in a driving mechanism for moving the drawing means and the movable base, and the restraint removing means may shift the restraining member to an inoperative position when the drawing means and the movable base are moved from the predetermined position to a position opposite the other tray by the driving mechanism.

When the restraint removing means is included in the driving mechanism, the restraining member is shifted to the releasing position when the movable base and the drawing means are moved to a position to select a tray which has been restrained by the restraining member. Thus, the restraining member can be moved to the inoperative position simply by moving the movable base for tray selection without using any additional mechanism for moving the restraining member to the inoperative position. Furthermore, the a disk selecting operation can be started immediately after the movable base has been moved to the tray selecting position, which reduces time necessary before driving the disk.

Preferably, an elastic tray holding means capable of holding the trays is placed in the disk package, and the tray holding means exerts a force for returning the trays into and holding the same in the disk package when the trays contained in the disk package inserted into the loading region strike against the restraining member.

When the elastic tray holding means is employed, the projection of the trays from the disk package due to shocks or acceleration exerted thereon when the disk package is loaded into the disk operating apparatus can be limited by the restraining member (or by the drawing means or the movable base), and the trays are returned into and held in the disk package by the holding means. Therefore, the trays are always securely held in the disk package by the holding means.

DESCRIPTION OF THE PREFERRED EMBODIMENTS

Preferred embodiments of the present invention will be described hereinafter with reference to the accompanying drawings.

Figure 1:
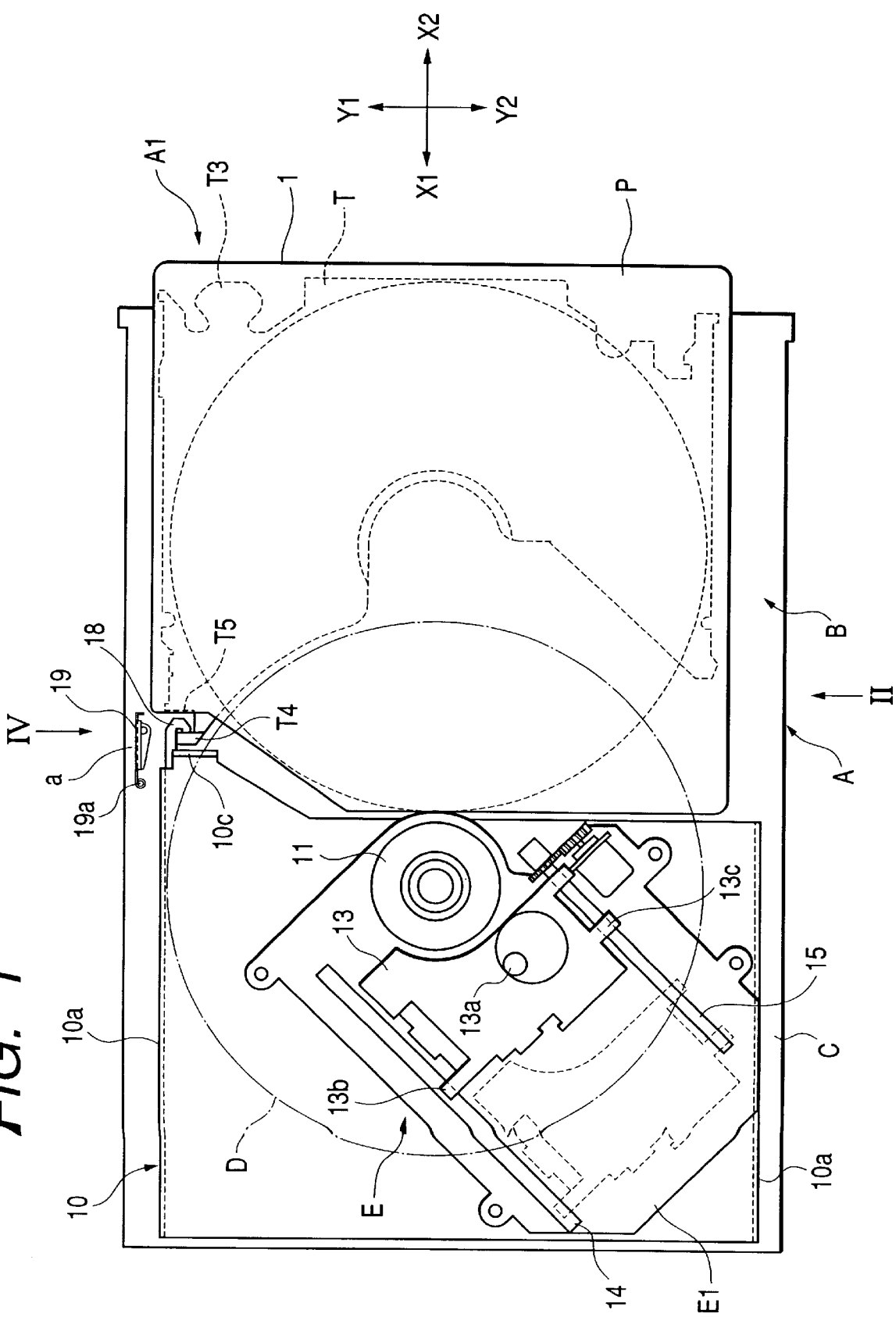
FIG. 1 is a plan view of a disk operating apparatus in a preferred embodiment according to the present invention.
Figure 2:
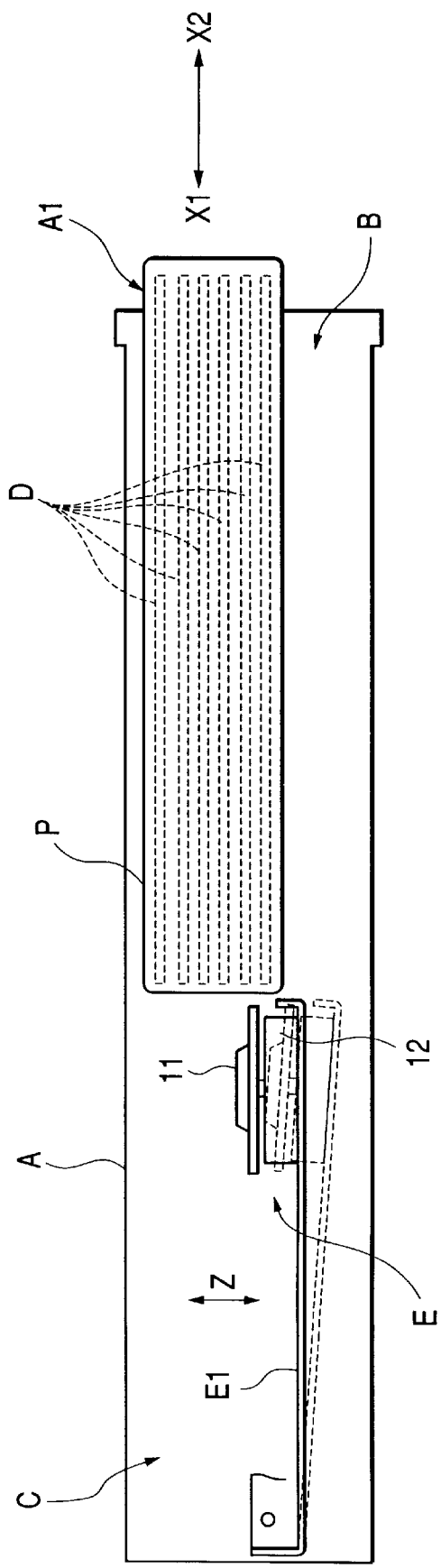
FIG. 2 is a longitudinal sectional view taken in the direction of the arrow II in FIG. 1.
Figure 3:
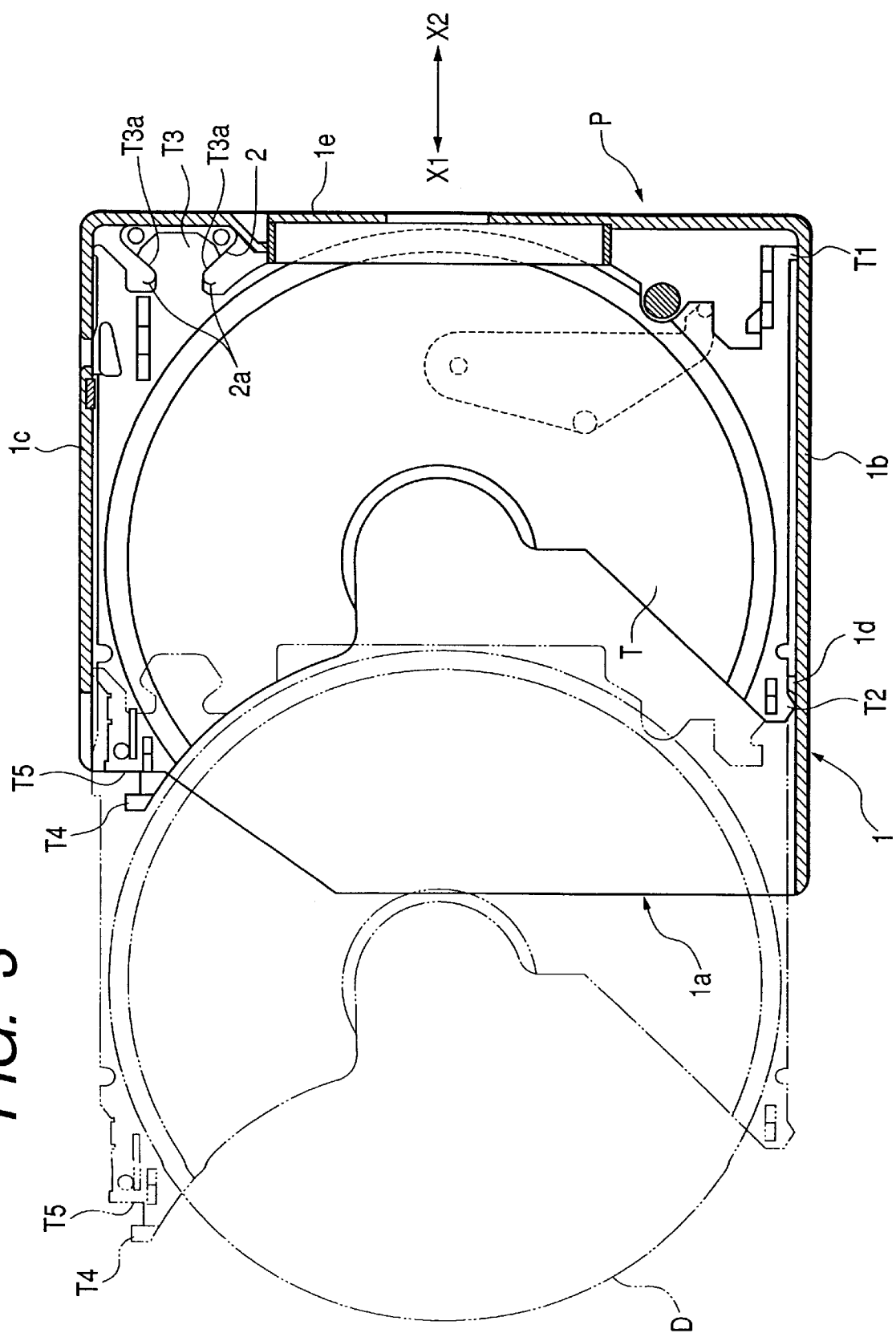
FIG. 3 is a sectional plan view of a disk package.

FIG. 1 is a plan view of a disk-selective disk operating apparatus in a preferred embodiment according to the present invention, FIG. 2 is a longitudinal sectional view taken in the direction of the arrow II in FIG. 1; and FIG. 3 is a sectional plan view of a disk package.

Referring to FIG. 1, the disk operating apparatus has a rectangular case A having longer sides extending along an X-axis. The case A has a loading region B on the right side, as viewed in FIG. 1, and a disk driving region C on the left side, as viewed in FIG. 1. A disk package (hereinafter referred to simply as "package") P is inserted into the loading region B. A disk drive unit E and a lifting base (movable base) 10 are disposed in the disk driving region C. A package inlet A1 is formed in the right end wall, as viewed in FIG. 1, to receive the package P into the disk operating apparatus.

The disk drive unit E is mounted on the lifting base 10. The disk drive unit E has a drive plate E1, a turntable 11 having a hub to be fitted in the central opening of a disk D and mounted on the drive plate El, and a spindle motor 12 for driving the turntable 11 for rotation. A guide rod 14 is extended in parallel to the radius of the disk D supported on the turntable 11, and a driving threaded shaft 15 is extended in parallel to the guide rod 14. A bearing block 13b of an optical head 13 is supported for sliding on the guide rod 14, and a threaded block 13c of the optical head 13 linked to the driving threaded shaft 15. The optical head 13 is provided with a light emitting device, such as a laser diode, a light receiving device for sensing light rays reflected from the disk D, optical elements including a beam splitter, and an objective 13a disposed opposite to the recording surface of the disk D.

The package P accommodates a plurality of 12 cm diameter disks and 8 cm diameter disks. The package P is capable of simultaneously accommodating both ROM disks allowing only reading information therefrom, and RAM disks allowing writing information thereto. For example, ROM disks include CDs and DVD-ROMs, and RAM disks include PDs and DVD-RAMs. Disks of 8 cm in diameter are single CDs.

Referring to FIG. 3, the package P has a case 1 made of a synthetic resin, and provided with an opening la in its left end wall, as viewed in FIG. 3. A tray T is drawn out through opening la from the case 1. A plurality of trays T are contained in the case 1 so as to be drawn out from the case 1. In the package P shown in FIG. 3, the case 1 accommodates five trays T. A plurality of horizontal ribs, not shown, are formed on the respective inner surfaces of a left side wall 1b and a right side wall 1c of the case 1. The opposite side edges of each tray T are loosely fitted in grooves defined by the adjacent horizontal ribs so that the tray is able to slide along the X-axis. Stopping projections T1 and T2 are formed in a right end part and a left end part, respectively, of one of the side edges of the tray T, i.e., the lower side edge as viewed in FIG. 3. A stopping projection 1d is formed on the inner surface of the left side wall 1b of the case 1 integrally with the left side wall lb at a position between the stopping projections T1 and T2. A plate spring 2, i.e., a holding means, for holding the trays T by projections T3 formed respectively on the trays T is held on the inner surface of a front wall 1e, i.e., a right end wall as viewed in FIG. 3.

When the tray T is contained in the case 1 as indicated by continuous lines in FIG. 3, the holding projection T3 of the tray T is held by the plate spring 2 to lock the tray in place so that the tray T may not project through the opening 1a. When the tray T is drawn to the left, the holding projection T3 is disengaged from the plate spring 2 and the tray T can be drawn out through the opening la. Inclined surfaces T3a are formed on the opposite sides of a part of the holding projection T3 on the side of X1. Therefore, if the tray T lying at a position shown in FIG. 3 is pulled slightly in the direction X1, tips 2a of the plate spring 2 slide along the inclined surfaces T3a to pull back the tray T in the direction X2 into the package P. The tray T is pulled back into the package P unless the tray T is pulled so that bumps on the opposite sides of the holding projection T3 ride over the tips 2a of the plate spring 2 in the direction X1.

When the holding projection T3 is disengaged from the plate spring 2 and the tray T is pulled out from the case 1 by a predetermined length, the stopping projection T1 strikes against the stopping projection id of the case 1 to limit the projection of the tray from the case 1. In FIG. 3, the tray T pulled out to the outermost position is indicated by alternate long and two short dashes lines. If the tray T is pulled forcibly outward, a part of the tray T provided with the stopping projection T1 is distorted elastically, the stopping projection T1 rides over the stopping projection id, so that the tray T can be pulled out of the case 1. A hook T4 is formed at the left end, as viewed in FIG. 3, of the tray T, and a pulling force is exerted on the hook T4 to pull out the tray T from the case 1.

Figure 4:
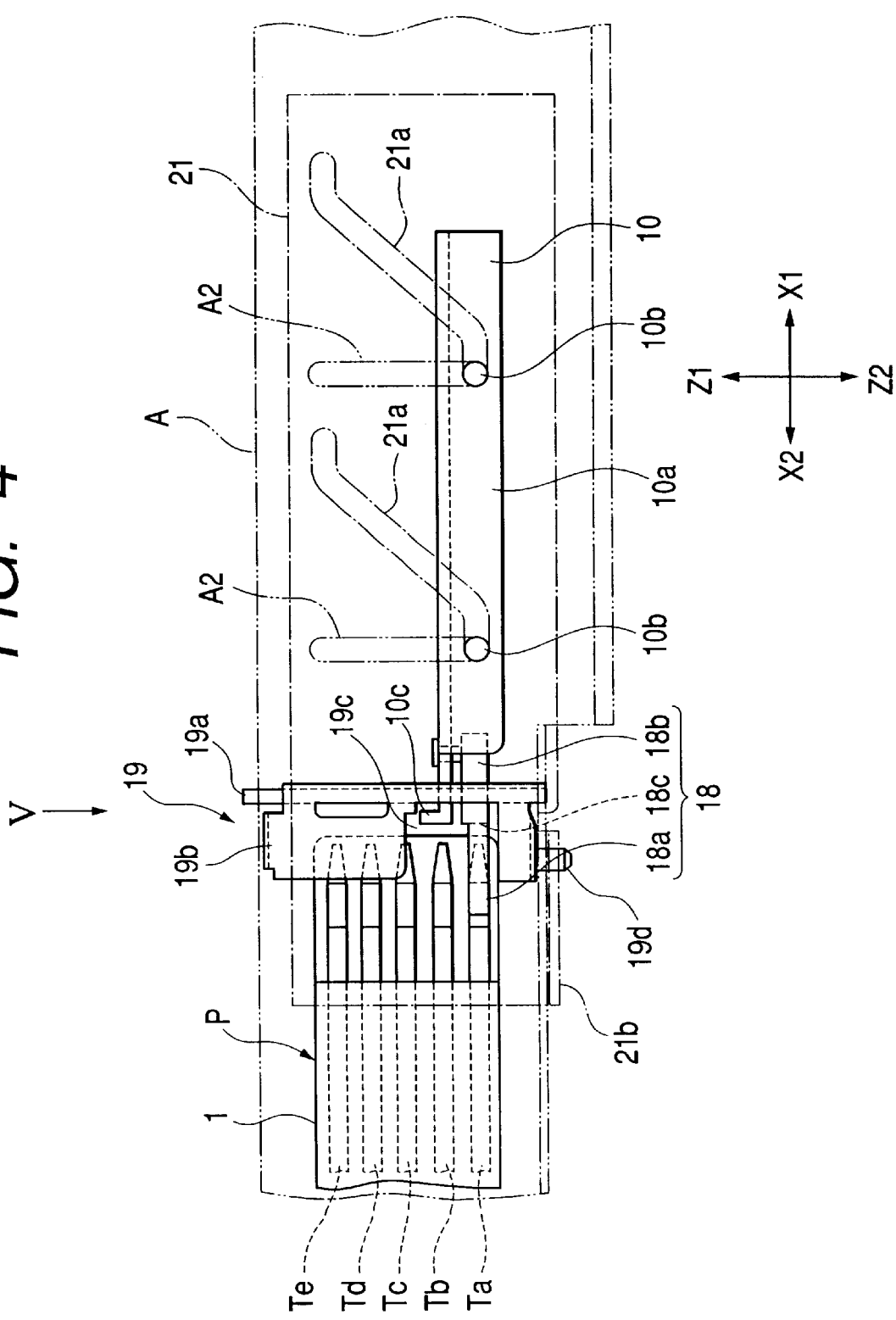
FIG. 4 is a side view taken in the direction of the arrow IV in FIG. 1.
Figure 5A:
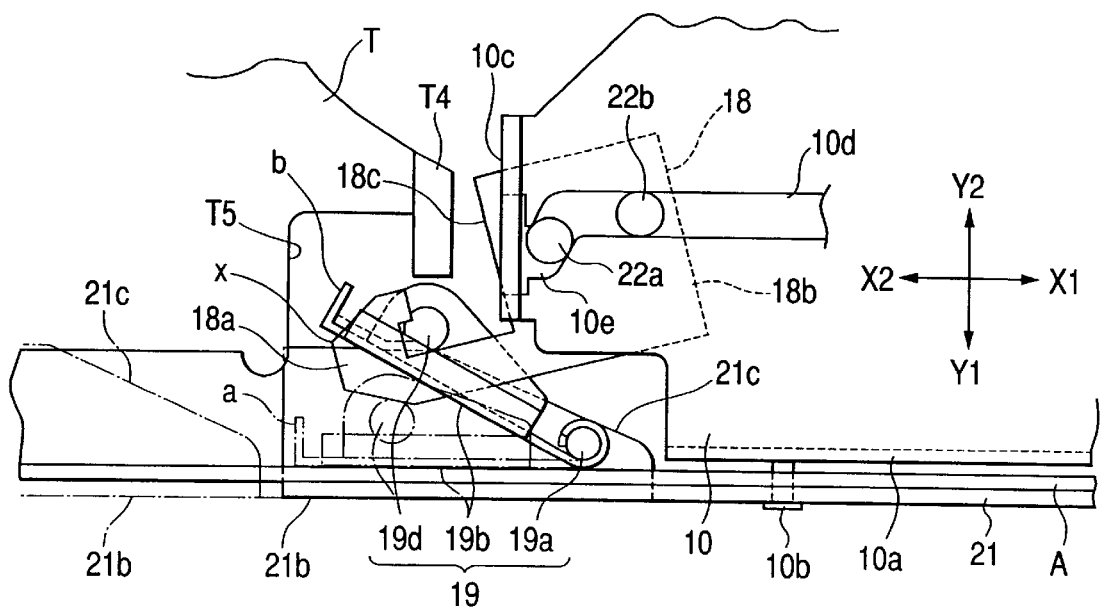
FIGS. 5A and 5B are enlarged fragmentary plan views of the disk operating apparatus in a state before engagement and a state after engagement, respectively, taken in the direction of the arrow V in FIG. 4.
Figure 5B:
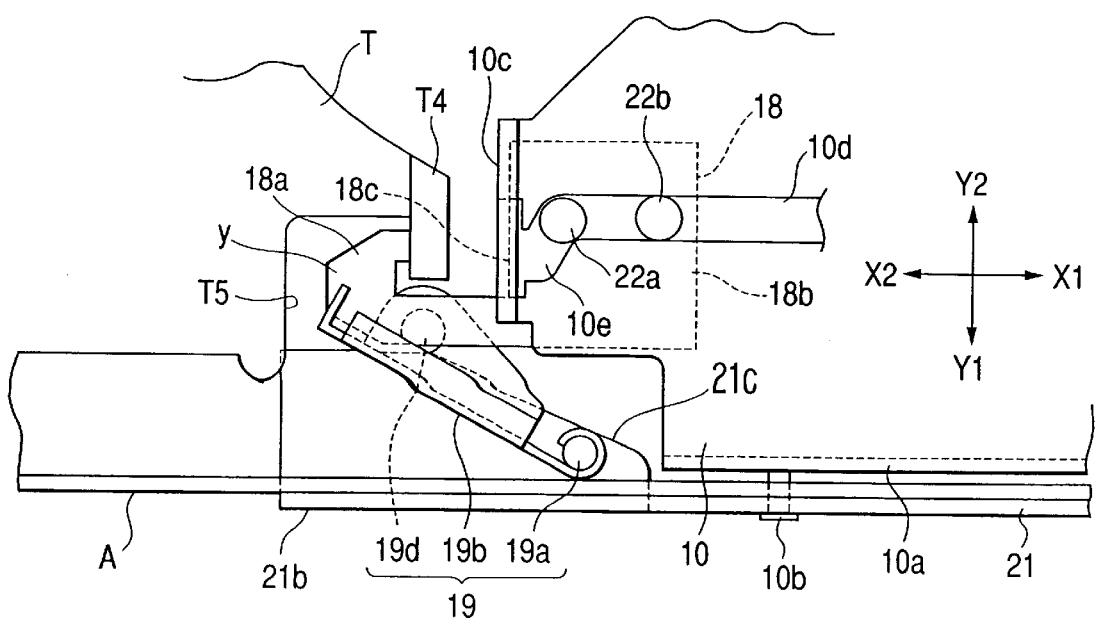

FIG. 4 is a side view taken along the direction of the arrow IV in FIG. 1, and FIGS. 5A and 5B are enlarged fragmentary plan views of the disk operating apparatus in an state before engagement and a state after engagement, respectively, taken in the direction of the arrow V in FIG. 4.

The lifting base 10 placed in the disk driving region C in the case A is formed by bending a metal plate and has opposite side walls 10a. As shown in FIG. 4, vertical slots A2 extending along the Z-axis are formed in the side walls of the case A. A driving member 21 provided with inclined slots 21a disposed so as to slide along the X-axis along the outer surfaces of the side walls 10a. Guide pins 10b projecting from the side walls 10a of the lifting base 10 are fitted in the vertical slots A2 and the inclined slots 21a. A lifting mechanism, not shown, is constructed in the case A to drive the driving member 21 along the X-axis.

For example, if the driving member 21 is moved in the direction of the arrow X2 by the lifting mechanism in an initial state in which the lifting base 10 at its lowermost position, the guide pins 10b are raised in the direction of the arrow Z1 by the inclined slots 21a of the driving member 21. Similarly, if the driving member is moved in the direction of the arrow X1 in a state where the lifting base 10 is at its uppermost position, the guide pins 10b are lowered by the inclined slots 21a of the lifting member 21. Since the guide pins 10b driven by the inclined slots 21a are guided by the vertical slots A2 of the case A, the lifting base 10 is moved linearly along the Z-axis.

Referring to FIG. 1, a stopper 19 serving as a restraining member is placed in an upper end region (Y1) of the interior of the case A. As shown in FIG. 4, the stopper 19 has a fan-shaped restraining part 19b provided with a recess 19c. A pivot shaft 19a is attached to one end of the restraining part 19b on the side of X1, and the pivot shaft 19a is supported for turning in the case A. The stopper 19 is able to turn on the pivot shaft 19a. The pivot shaft 19a of the stopper 19 is biased by a biasing means, not shown, such as a torsion coil spring or the like, in a counterclockwise direction as viewed in FIG. 1 or FIG. 5 to hold the restraining part 19b at an idle position a in parallel to the case A. A protrusion 19d is formed on the lower end surface of the restraining part 19b so as to project in the direction of the arrow Z2 from the bottom wall of the case 10.

As shown in FIG. 4, the driving member 21 has an extension extended in the direction of the arrow X2, a lower part on the side of Z2 of the extension is bent inward along the bottom surface of the case A to form a restraint removing part 21b. The driving member 21 and the restraint removing part 21b serve as a restraint removing means.

In FIGS. 5A and 5B, the restraint removing part 21b is indicated by dotted lines or alternate long and short dash lines. An inclined edge 21c is formed in a right end part (X1). When the driving member 21 is moved in the direction of the arrow X1, the inclined edge 21c of the restraint removing part 21b engages with the protrusion 19d formed on the lower end surface of the restraining part 19b. As the driving member 21 is moved further in the direction of the arrow X1, the protrusion 19d rides on the inclined edge 21c and thereby the stopper 19 is turned clockwise to an operative position b as indicated by continuous lines.

When the driving member 21 is moved in the direction of the arrow X2, the inclined edge 21c is disengaged from the protrusion 19d, and the stopper 19 is turned counterclockwise by the biasing member to the inoperative position a. Thus, the stopper 19 can be set at either the inoperative position a or the operative position b by moving the driving member 21 along the X-axis.

Referring to FIGS. 1, 4 and 5, an end part of the lifting base 10 on the side of X2 is bent in the direction of the arrow Z1 to form an end wall 10c. A drawing lever 18, i.e., a drawing means, is extended under the end wall 10c in the direction of the arrow X2. The drawing lever 18 moves together with the lifting base 10 along the Z-axis and is driven for movement along the X-axis by a drawing mechanism, not shown, mounted on the lifting base 10.

As shown in FIGS. 5A and 5B, the drawing lever 18 has a base part 18b placed on the lower surface of the lifting base 10, and a catching part 18a formed integrally with the base part 18b so as to project from the latter. Guide pins 22a and 22b are arranged side by side on the base part 18b so as to extend along the Z-axis. The guide pins 22a and 22b are fitted in a guide grove 10d formed in the lifting base 10. The drawing lever 18 is guide by the guide groove 10d for linear movement along the X-axis on the lifting base 10.

A crank part 10e is formed at one end on the side of X2 of the guide groove 10d. When the drawing lever 18 is moved in the direction of the arrow X2 to a limit position by the drawing mechanism, not shown, only the guide pin 22a enters the crank part 10e and, consequently, the drawing lever 18 turns counterclockwise on the guide pin 22b as shown in FIG. 5A. Consequently, the catching part 18a is disengaged from the tray T and is moved to a position x where the catching part 18a is unable to catch the hook T4. When the drawing lever 18 is moved from the position shown in FIG. 5A in the direction of the arrow X1, the guide pin 22a moves out of the crank part 10e and enters the straight guide groove 10d, so that the drawing lever 18 is turned clockwise to a position y shown in FIG. 5B where the catching part 10a is able to engage with the hook T4 of the tray T. As the drawing lever 18 is moved further in the direction of the arrow X1, the tray T is drawn out from the case 1 through the opening 1a of the case 1.

As shown in FIG. 4, when the driving member 21 is moved in the direction of the arrow X1 to a limit position and the lifting base 10 is at its lowermost position, the hooks T4 of the bottom tray Ta and the second bottom tray Tb immediately above the bottom tray Ta correspond to the recess 19c of the stopper 19. The hook T4 of the bottom tray Ta is opposite to a contact surface 18c formed in the base part 18b of the drawing lever 18 via the recess 19, and the hook T4 of the tray Tb is opposite to the end wall 10c of the lifting base 10. The catching part 18a of the drawing lever 18 lies in the recess 19c opposite to the hook T4 so as to be able to engage with the hook T4.

The operation of the disk operating apparatus thus constructed will be described hereinafter.

As shown in FIG. 4, the lifting base 10 is held at its lowermost position as shown in FIG. 4 at a stage before the disk package P is loaded into the disk operating apparatus; that is, the driving member 21 is at the limit position on the side of X1, and the lifting base 10 is lowered by the inclined slots 21a.

In this state, the protrusion 19d is pushed by the inclined edge 21c of the restraint removing part 21b, the stopper 19 is turned clockwise to the operative position b. The drawing lever 18 is moved in the direction of the arrow Z2 to the limit position and is held on standby at the position x shown in FIG. 5A.

The case 1 of the package P is loaded into the disk operating apparatus through the package inlet A1 formed in the right end wall, as viewed in FIGS. 1 and 2, of the disk operating apparatus, and the case 1 is locked in place in the loading region B by a locking mechanism, not shown.

The package P is inserted into the loading region B with the opening 1a directed toward the side of X2. When the package P is completely inserted in the loading region B, the three trays Tc, Td and Te from the top contained in the package P are disposed opposite to the restraining part 19b of the stopper 19 held at the operative position b as shown in FIG. 5A with a small gap between the trays Tc, Td and Te, and the restraining part 19b. The hook T4 of the bottom tray Ta is opposite to the contact surface 18c of the drawing lever 18 with a small gap therebetween, and the hook T4 of the second bottom tray Tb is opposite to the end wall 10c of the lifting base 10 with a small gap therebetween.

Accordingly, even if the trays are caused to project from the case 1 through the opening 1a by shocks or acceleration when the package P is inserted into the loading region, the restraining part 19b, the contact surface 18c of the drawing lever 18 and the end wall 10c of the lifting base 10 restrain the trays from projecting through the opening 1a from the case 1. If the package P is inserted into the loading region with the trays slightly projecting through the opening 1a from the case 1, the trays T are pushed back into the package P by the restraining part 19b, the contact surface 18c and the end wall 10c when the package P is inserted into the loading region.

Intervals between the trays T and the restraining part 19b, the contact surface 18c and the end wall 10c when the package P is inserted into the loading region B are maintained even if a force acting to project the trays T from the case 1 acts on the trays T because the trays T are biased into the package P by the plate springs 2 shown in FIG. 3. The trays T come into contact with the restraining part 19b, the contact surface 18c and the end wall 10c, respectively, when each tray T is moved outward by a distance which does not make the tips 2a of the plate spring 2 ride over the bumps of the holding projection T3 of the tray T. Therefore, the trays T are always held in the package P by the plate springs 2 so that the trays T may not project through the opening 1a from the package P.

The bottom tray Ta can be drawn out of the package P immediately after the package P has been inserted into the loading region B.

When the guide pin 22b of the drawing lever 18 is moved in the direction of the arrow X1 immediately after the package P has been inserted into the loading region B, the catching part 18a of the drawing lever 18 turns clockwise in the recess 19c of the stopper 19 to the position y and engages with the hook T4 of the tray Ta as shown in FIG. 5B. Subsequently, the bottom tray Ta is drawn through the opening 1a of the package P toward the disk drive unit E by moving the drawing lever 18 in the direction of the arrow X1. The rest of the trays are restrained from projecting from the package P by the end wall 10c of the lifting base 10 and the restraining part 19b of the stopper 19. Thus, time necessary for making the disk supported on the bottom tray Ta ready to be driven after the package P has been inserted into the loading region B can be reduced.

When drawing out the tray Tb, Tc, Td or Te, the lifting base 10 is raised to a position for drawing out the tray Tb, Tc, Td or Te.

The lifting base 10 is raised by the inclined slots 21a by moving the driving member 21 in the direction of the arrow X2, and the lifting base 10 is stopped at a position where the drawing lever 18 is located at a position for drawing out the tray Tb, Tc, Td or Te.

The inclined edge 21c of the restraint removing part 21b is disengaged from the protrusion 19d when the driving member 21 is moved in the direction of the arrow X2, the stopper 19 is turned counterclockwise to the inoperative position a indicated by broken lines in FIG. 5A, where the stopper 19 is unable to restrain the tray from projecting from the package P. Therefore, the stopper 19 can be moved to the inoperative position a and the selected tray can be drawn out by moving the drawing lever 18 in the direction of the arrow X1 immediately after the completion of selection of the tray by raising the lifting base 10 to a position corresponding to the selected tray, without requiring additional time and without using any other driving mechanism.

Although the recess 19c is formed in a lower part of the stopper 19 in this embodiment, the recess 19c may be formed in other part of the stopper 19 and the drawing lever or the lifting base may be disposed opposite to the tray other than the bottom tray through the recess.

As is apparent from the foregoing description, according to the present invention, in the disk operating apparatus into which the package is inserted with its opening directed forward, the trays are restrained from projecting from the opening of the package by the restraining member, the drawing means and the movable base.

The tray opposite the drawing means can be drawn out immediately after the package has been inserted into the disk operating apparatus, and any one of the rest of the trays can be drawn out immediately after the completion of selection of the tray by moving the movable base.

What is claimed is:

1. A disk operating apparatus comprising:
   a disk package capable of storing, in layers, a plurality of trays carrying disks, and provided with an opening through which the trays are put into and taken out;
   a case having a loading region into which said disk package is inserted with the opening thereof directed in a direction in which the disk package is inserted into the loading region;
   disk driving means for driving the disk for a writing and/or a reading operation;
   a movable base capable of moving in a direction along which the disks are arranged to select the disk; and
   drawing means mounted on the movable base to draw out a selected tray from the disk package so that the disk can be loaded into the disk driving means;
   a restraining member provided with a pivot shaft standing at one end of an inserting side of the disk package loaded in the loading region, and a restraining part fixed to the pivot shaft, the restraining member restraining the trays from projecting from the disk package by turning the restraining part on the pivot shaft so as to face adjacent of the inserting side of the package when the disk package is inserted into the loading region, and turning the restraining part on the pivot shaft in the opposite direction into an inoperative position that allows the trays to be put in and taken out of the disk package when the trays are drawn out of the disk package;

biasing means for biasing the restraining member in a direction in which the restraining part is moved to the inoperative position: and a driving member movable relative to and along a side face of the case in one direction for turning the restraining member against the biasing force from the biasing means so as to shift the restraining part to a position facing the adjacency of the inserting side of the package when the disk package is inserted into the loading region, and moving along the side face of the case in direction opposite from the one direction so as to release the force exerted on the restraining member against the biasing force when the trays are drawn out of the inserted disk package.

2. The disk operating apparatus according to claim 1, wherein the restraining part of the restraining member does not correspond to one of the trays when the disk package is inserted into the loading region, and a part of the drawing means stops at a predetermined position adjacent the tray to which the restraining part of the restraining member does not correspond so as to restrain the tray from projecting from the disk package.

3. The disk operating apparatus according to claim 2, wherein a part of the movable base stopping at a predetermined position corresponds to a tray adjacent to the tray to which the part of the drawing means corresponds so as to restrain the adjacent tray from projecting from the disk package.

4. The disk operating apparatus according to claim 3, wherein an elastic tray holding means capable of holding the trays in the disk package is placed in the disk package, and the tray holding means exerts a force for returning the trays into and holding the same in the disk package when the trays contained in the disk package inserted into the loading region strike against the restraining part of the restraining member, the part of the drawing means, and the part of the movable base.

5. The disk operating apparatus according to claim 2, wherein the tray restrained from projecting from the disk package by the drawing means can be drawn out of the disk package while the rest of the trays are restrained from projecting from the disk package by the restraining part of the restraining means.

6. The disk operating apparatus according to claim 5, wherein an elastic tray holding means capable of holding the trays in the disk package is placed in the disk package, and the tray holding means exerts a force for returning the trays into and holding the same in the disk package when the trays contained in the disk package inserted into the loading region strike against the restraining part of the restraining member and the part of the drawing means.

7. The disk operating apparatus according to claim 2, wherein the driving member is included in a driving mechanism for moving the drawing means and the movable base, and the driving member shifts the restraining member to the inoperative position when the drawing means and the movable base are moved from the predetermined position to a position opposite another tray by the driving mechanism.

8. The disk operating apparatus according to claim 7, wherein an elastic tray holding means capable of holding the trays in the disk package is placed in the disk package, and the tray holding means exerts a force for returning the trays into and holding the same in the disk package when the trays contained in the disk package inserted into the loading region strike against the restraining part of the restraining member and the part of the drawing means.

9. The disk operating apparatus according to claim 2, wherein an elastic tray holding means capable of holding the trays in the disk package is placed in the disk package, and the tray holding means exerts a force for returning the trays into and holding the same in the disk package when the trays contained in the disk package inserted into the loading region strike against the restraining part of the restraining member and the part of the drawing means.

10. The disk operating apparatus according to claim 1, wherein an elastic tray holding means capable of holding the trays in the disk package is placed in the disk package, and the tray holding means exerts a force for returning the trays into and holding the same in the disk package when the trays contained in the disk package inserted into the loading region strike against the restraining part of the restraining member.

* * * * *